Nov. 25, 1924.
F. C. McGUIRE
GLARE SHIELD
Filed Dec. 1, 1922
1,516,776
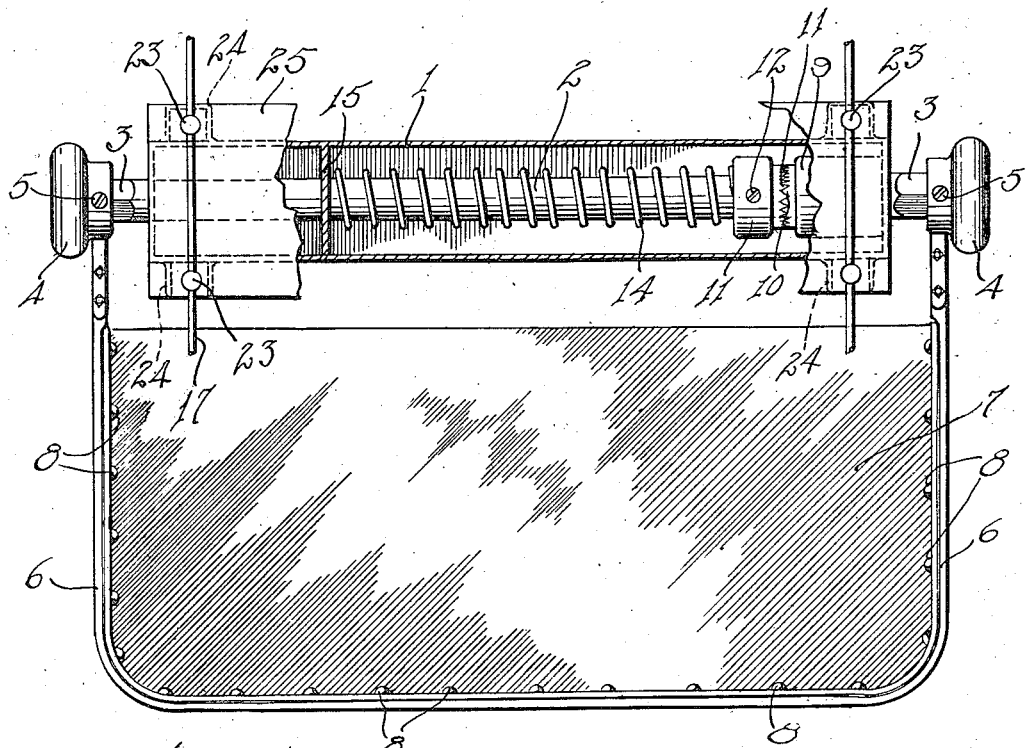
INVENTOR
F. C. McGuire
BY
ATTORNEYS Patented Nov. 25, 1924.

1,516,776

UNITED STATES PATENT OFFICE.

FRANCIS CHARLES McGUIRE, OF MACOMB, ILLINOIS.

GLARE SHIELD.

Application filed December 1, 1922. Serial No. 604,393.

*To all whom it may concern:*

Be it known that I, FRANCIS CHARLES MC-GUIRE, a citizen of the United States, and a resident of Macomb, in the county of McDonough and State of Illinois, have invented a new and useful Improvement in Glare Shields, of which the following is a full, clear, and exact description.

My invention relates to improvements in glare shields for automobiles and the like, and it consists in the combinations, constructions, and arrangements herein described and claimed.

An object of my invention is to provide a glare shield which may be readily attached to an automobile top with but slight alterations being necessary in the latter.

A further object of my invention is to provide a device of the type described in which the shield may be locked in such position.

A further object of my invention is to provide a device of the type described in which the glare shield may be instantly adjusted at will to any position desired.

A further object of my invention is to provide a device of the type described which is simple in construction, durable and efficient for the purpose intended and which is not likely to easily get out of order.

Other objects and advantages will appear in the following specification, and the novel features of the invention will be particularly pointed out in the appended claim.

My invention is illustrated in the accompanying drawings forming part of this application, in which—

Figure 1 is a top plan view of the device, and

Figure 2 is a side elevation of the device as shown operatively applied to an automobile top.

In carrying out my invention I provide a casing 1, which in the present form is rectangular in shape. The shaft 2 is rotatably mounted in the casing 1 and has square ends 3. The ends 3 of the shaft 2 have knobs 4 secured thereto by means of set screws 5. The knobs 4 carry a frame 6, (see Figure 1). The frame 6 carries a glare shield 7, which may be made of any transparent material desired such as isinglass or mica. The shield 7 is colored so as to stop the direct rays of the sun or other illuminated object from blinding the eyes of the driver. The shield 7 is secured to the frame 6 by means of rivets 8 or the like, whereby the shield is turned or swung as a unit with the frame 6. It will be obvious from this construction that the frame 6 and the shield 7 can be swung when the knobs 4 are rotated.

In Figure 1 I have shown a novel means for rigidly holding the shaft 2 in adjusted position, whereby the glare shield is held in the position into which it is swung. This means comprises a clutch which is mounted upon the shaft 2 and which is adapted to hold the shaft in fixed position. The clutch consists of a fixed member 9 which is secured to the casing 1 and which has teeth 10 therein, and a member 11 which is rigidly secured to the shaft 2 by means of a set screw 12 and which has teeth 13 therein. The teeth 10 and 13 of the members 9 and 11 are adapted to mesh with each other so as to lock the shaft 2 with respect to the member 9. The member 10 is yieldingly held in engagement with the member 9 by means of a spring 14 which is mounted upon the shaft 2 and which bears against the member 11 and against the transverse plate 15 of the casing 1. In rotating the shaft 2 with respect to the casing 1, it is merely necessary to grasp either of the knobs 4 and move the knobs so as to release the member 11 from the member 9, whereupon the shaft 2 may be readily rotated.

The device is adapted to be secured to the top 16 of an automobile by means of rods 17. The rods 17 are bent around the bow 18 of the top and are disposed in openings 19 in the bow 20. The portions of the rods which are disposed in the openings 19 are threaded and received nuts 21 whereby the rods are securely held in place to the bolts. A set screw 22 locks the other ends to the rods about the bow 18.

The casing 1 is secured to the rods 17 by means of eye-bolts 23. The eye-bolts are received in lugs 24, the lugs being integral projections of the casing 1. The casing 1 is closed on all of its sides except one, this side being enclosed by means of a plate 25. The plate 25 has openings which receive the eye-bolts 23 that project from the lugs 24. The free ends of the eye-bolts have openings therein through which the rods 17 are disposed. The rods 17 are of such size that the eye-bolts can not be readily moved with respect to the rods, whereby the device is firmly held in place. The nuts on the eye-bolts are tightened to cause the rods 17 to frictionally engage with the plate 25.

From the foregoing description of the various parts of the device, the operation thereof may be readily understood. In assembling the device to the top of an automobile, it is merely necessary to bore two openings in the bow 20. These openings should be the same distance apart as the eye-bolts 23. The rods 17 are now wound around the bow 18 and are rigidly secured thereto by means of a set screw 22. The other ends of the rods 17 are disposed in the openings 19 in the bow 20. The rods 17 are first inserted through the openings in the eye-bolts 23 before they are disposed in the openings 19. As heretofore stated, the eye-bolts are frictionally held on the rods 17 so that the device is retained in adjusted position. The casing 1 is preferably disposed adjacent to the bow 20 so as to dispose the shield 7 adjacent to the wind shield 21 of the automobile.

The operator may swing the shield 7 from the full line position shown in Figure 2 into the dotted line position by merely releasing the member 11 from the member 9 and rotating the shaft 2. As soon as the operator has swung the shield 7 into the desired position, he may release his hold upon the knob 4 and thus permit the member 11 to engage with the member 9 so as to hold the shaft 2 in adjusted position. It will therefore be seen from this construction that the shield may be swung into operative or inoperative position at the will of the driver. The device is extremely simple in operation and construction, and is not likely to easily get out of order. It provides a novel and efficient means for eliminating the glare from the headlights of approaching vehicles, or the glare of the sun from striking the eyes of the driver and temporarily blinding him.

I claim:

A glare shield comprising a casing, two spaced apart wires adapted to be carried by an automobile top and to be spaced in parallel relation with respect to each other, a pair of eye bolts for each wire being adapted to rigidly secure the casing in adjusted position along the wires, thereby providing a firm support for said casing, a rod rotatably and slidably carried by said casing, a stationary clutch member carried by said casing, a second clutch member rigidly secured to said rod, said rod being adapted to move said second clutch member out of engagement with said first named clutch member, yielding means for causing said clutch member to engage with each other and a glare shield rigidly secured to said rod to hold it in adjusted position.

FRANCIS CHARLES McGUIRE.